Oct. 13, 1936.     G. WOLFF     2,057,177
APPARATUS FOR CLEANING AND DEGREASING METAL ARTICLES AND THE LIKE
Filed March 17, 1933
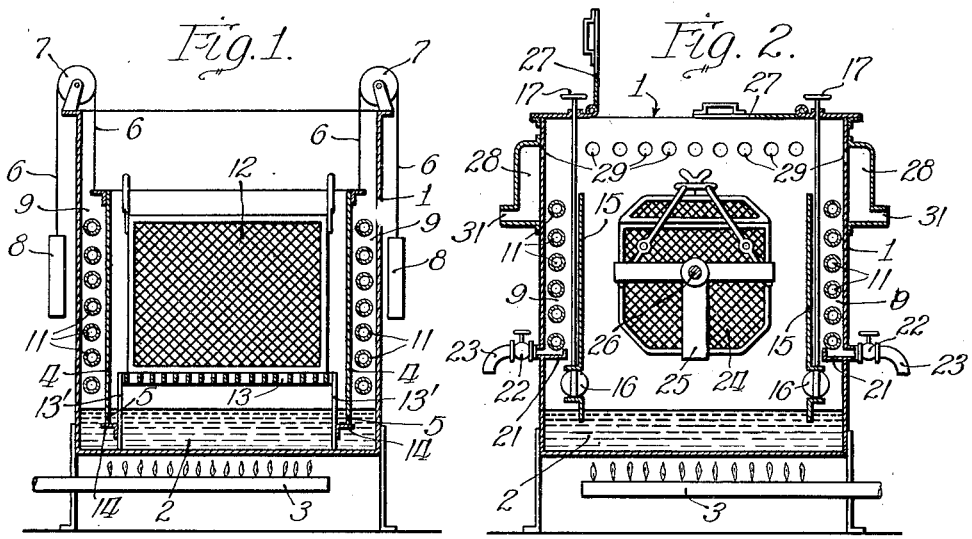
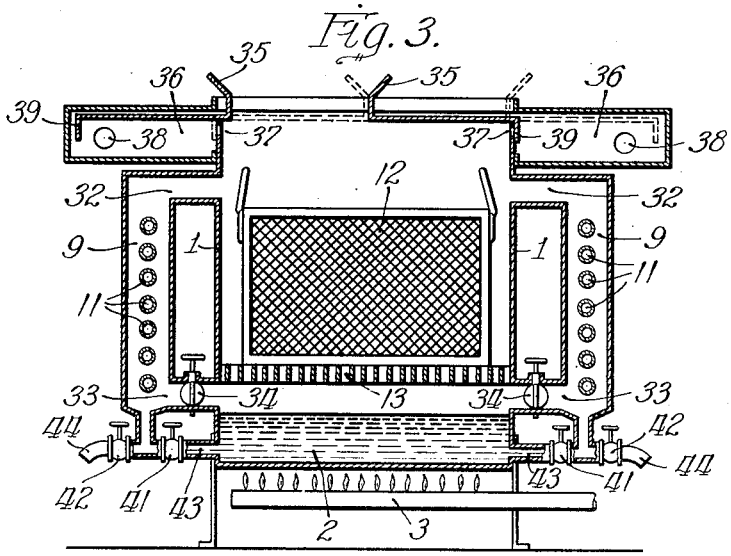
Inventor:
Georg Wolff
By: Brown, Jackson, Boettcher & Dienner,
Attys, Patented Oct. 13, 1936

2,057,177

UNITED STATES PATENT OFFICE 2,057,177

APPARATUS FOR CLEANING AND DEGREASING METAL ARTICLES AND THE LIKE

Georg Wolff, Munich, Germany, assignor to Dr. Alexander Wacker Gesellschaft fur Elektrochemische Industrie G. m. b. H., Munich, Germany Application March 17, 1933, Serial No. 661,330
In Germany August 1, 1932

7 Claims. (Cl. 87—6)

This invention relates to an apparatus for cleaning and removing grease and the like from solid articles by means of volatile cleaning liquids or their vapors and has for its object to simplify the apparatus, to greatly save time necessary for cleaning, and to completely avoid the loss of the cleaning liquids in an open washing vessel and eliminating danger to attendants.

The present invention comprises cooling means arranged laterally of the vapor space in which the articles to be cleaned are placed, and separated therefrom by a partition. During the cleaning process, the vapors, being heavier than air, overflow the partition and are condensed by the cooling means.

The vapor space may be brought into communication with the cooling means by raising the separating partition, or by opening a valve in the partition, thereby condensing the vapors and lowering the vapor space until the vapors no longer envelop the articles to be cleaned. The articles are then dried in the air.

Referring to the drawing, Figure 1 is a vertical sectional view of the apparatus;

Figure 2 is a vertical sectional view of a modification, and

Figure 3 is a vertical sectional view of another modification.

I is a vessel, preferably of sheet metal, having an open top, and partially filled with a cleaning liquid 2 which may be heated by a source of heat 3. A casing 4, preferably of sheet metal, is arranged inside the vessel I and projects into the cleaning liquid at 5. The casing 4 hangs vertically movable on wire cables 6 which run over pulleys 7 mounted on the upper edge of the vessel. Cables 6 carry counterweights 8 at their free ends. In the cooling spaces 9 between the casing 4 and the walls of the vessel I are arranged cooling tubes II through which flow cooling fluid. A perforated basket 12 filled with articles to be cleaned is inserted in the vessel I from the top part thereof, into the space enclosed by the casing 4, and may rest on a grate 13 disposed above the surface of the cleaning liquid 2. The casing 4 rests on stops 14 mounted on grate supports 13'.

The cleaning liquid 2 is preferably heated to its boiling point, the vapors given off gradually filling the whole inner space of the casing 4, forming a vapor space above the surface of the liquid. The vapors overflow the upper edges of the casing 4, and being heavier than air, drop into cooling spaces 9 where they are condensed on the cooling tubes II. The vapor space only reaches to the upper edge of the casing 4, and does not rise higher, although there is no cooling apparatus above it.

The evolved vapors condense on the cooler articles to be cleaned, and the condensed vapors dissolve the grease, etc. therefrom. When cleaning is completed in the vapor space, the casing 4 is raised until it no longer projects into the liquid, permitting communication between cooling tubes II, and the lower part of the vapor space above the liquid. The vapors flow from the vapor space into the cooling space and are condensed by the cooling tubes, thereby causing the vapor space to sink to the height of the lowest part of the cooling tubes, which lie slightly lower than the grate 13. The basket 12 containing the articles to be cleaned is no longer enveloped by the vapors, and is quickly dried by the air entering from the top of the vessel. The basket is now removed from the vessel I, replaced by one filled with fresh articles to be cleaned, and casing 4 is lowered until it again projects into the cleaning liquid 2, and the operation is repeated.

In Figure 2, vessel I has a casing 15 projecting into cleaning liquid 2, the casing being provided at its lower end with valves 16 controlled by knobs 17 outside of the vessel. Between the casing 15 and the walls of the vessel I are cooling spaces 9 in which are arranged cooling tubes II. A closed perforated basket 24 containing the articles to be cleaned is inserted in a frame 25 which is rotatably mounted on a shaft 26. The top of the vessel is provided with hinged covers 27 adapted to close the top of the vessel.

Valves 16 are closed and the cleaning liquid is heated to the boiling point, the vapors given off filling the vapor space above the liquid. The rotation of the frame and basket permit a thorough cleaning and drying of the articles therein, especially if they are hollow articles. The vapors overflow at the top of casing 15 and are condensed by cooling tubes II. The condensed vapors are caught by gutters 21 arranged directly under the cooling tubes. When valves 22 are open, the condensed vapors pass through the valves and tubes 23, and may be caught in suitable containers (not shown). When valves 23 are closed, the condensed vapors overflow the gutters 21 and are mixed with the cleaning liquid 2. The hinged covers 27 need not be air-tight but may permit the passage of a small amount of air.

The air in the upper part of the vessel I may absorb some vapors by diffusion, and to renew the air and prevent outward passage of unpleasant vapors, suction pockets 28 are arranged on the outside top wall of the vessel, communicating with the inside of the vessel by means of openings 29, and by means of tubes 31 with a suction device (not shown).

After the objects have been cleaned, valves 16 are opened, allowing communication between the vapor space and the cooling tubes. The vapors are condensed by the cooling tubes, lowering the vapor space, and the articles are then dried and removed.

In Fig. 3 the cooling tubes 11 are arranged in cooling spaces 9, which connect with vessel 1 by means of upper connecting passages 32 and lower connecting passages 33, provided with valves 34. The upper connecting passages 32 determine the height to which the vapors rise in the vessel before they overflow into cooling spaces 9. A perforated basket 12 containing the articles to be cleaned may rest on a grate 13.

The top of the vessel 1 can be closed by sliding covers 35. Suction pockets 36 arranged on the top outside wall of the vessel communicate with the inside of the vessel by means of openings 37, and with a suction device (not shown) by means of tubes 38. Sliding covers 35 have flanges 39 at their outer ends, and when covers 35 are closed, flanges 39 close the openings 37 between the inner part of the vessel 1 and the suction pockets 36. By such an arrangement the exhaustion of the upper part of the vessel 1 only occurs as long as the sliding covers are open, thereby preventing escape of unpleasant vapors, while with closed covers no exhaustion is effected, but the vapors do not escape through the sliding covers.

When valves 34 are closed, the vapors rise, flow through passages 32, and are condensed by cooling tubes 11. When valves 41 are open, valves 42 are closed, the condensate falling from cooling tubes 11 passes through valves 41 and passages 43 to the cleaning liquid 2. When valves 41 are closed and valves 42 are open, the condensate will flow out through passages 44, and may be collected in suitable containers (not shown).

It is understood that many modifications may be made without departing from the spirit and scope of the invention. Instead of subjecting the articles to be cleaned to the action of cleaning vapors, the articles may be immersed in the cleaning liquid. The cleaning apparatus may contain only one cooling space instead of the cooling spaces illustrated, if the cooling tubes arranged therein are capable of condensing the cleaning vapors. Special openings and tube passages can be provided for the inflow and outflow of the liquid in the vessel 1. When the solvent becomes contaminated with dirt and grease, it may be removed and replaced by fresh cleaning liquid, or the cleaning liquid may be continuously removed and replaced by fresh cleaning liquid. The articles to be cleaned may be passed through the vessel 1, including the vapor space, by means of motor driven conveyor chains, conveyor bands, or the like, and may receive any suitable rotary motion if desirable. The vessel may be of any desired shape, such as circular, square, rectangular or the like.

The invention claimed is:—

1. In apparatus of the character described, a vessel adapted for containing in the lower portion thereof a body of volatile liquid, there being a vapor space within the vessel above the body of liquid, means for heating the liquid, a wall disposed adjacent and spaced from a side wall of the vessel and defining therewith a cooling space normally in communication with the upper portion of said vapor space, cooling means disposed within said cooling space, said cooling space normally being closed at its lower portion to said vapor space, and means for optionally establishing communication between the lower portion of said cooling space and the lower portion of the vapor space effective to cool the vapors in said vapor space and thereby cause lowering of said vapors in the vapor space.

2. In apparatus of the character described, a vessel adapted for containing in the lower portion thereof a body of volatile liquid to a considerable depth, there being a vapor space within the vessel above the body of liquid, means for heating the liquid, a partition structure constituting a wall at the side of and in part defining said space, said wall being spaced from an adjacent side wall of the vessel and defining therewith a space for reception of cooling means, cooling means disposed within the last mentioned space, said last mentioned space communicating at its upper portion with the upper portion of the vapor space and the wall of the partition structure normally extending below the top surface of the body of liquid and normally being closed to the lower portion of the vapor space, and means for optionally establishing communication between said cooling means and the lower portion of the vapor space effective for cooling and thereby causing lowering of the vapors in said space.

3. In apparatus of the character described, a vessel for containing in the lower portion thereof a body of volatile liquid and having a top open to the atmosphere for the insertion and removal of articles to be cleaned, there being a vapor space within said vessel above the liquid, means for heating the liquid, a wall disposed adjacent and spaced from a side wall of the vessel and defining therewith a cooling space communicating with the upper portion of said vapor space, said cooling space normally being closed to the vapor space remote from the upper portion thereof, cooling means disposed within said cooling space and means for optionally establishing communication between said cooling space and said vapor space remote from the upper portion of the latter and effective for cooling and thereby causing lowering of the vapors in said vapor space.

4. In combination in apparatus of the character described, a vessel for containing a volatile cleaning liquid, said vessel extending above the normal liquid level therein and defining a vapor space above the liquid, said vessel having a top open to the atmosphere for insertion and removal of articles to be cleaned, means for supporting the articles in said space, a partition within the vessel and disposed at the side of said vapor space, said partition projecting into the liquid and defining with the surrounding wall of said vessel a cooling space communicating at its upper end with said vapor space, cooling means disposed within said cooling space, and means for optionally establishing communication between said cooling space and said vapor space at the lower portion of the latter.

5. In combination in apparatus of the character described, a vessel for containing a volatile cleaning liquid, said vessel extending above the normal liquid level therein and defining a vapor space above the liquid, said vessel having a top open to the atmosphere for insertion and removal of articles to be cleaned, means for heating the liquid, means for supporting the articles in said space, a partition within the vessel and disposed at the side of said vapor space, said partition projecting into the liquid and defining with the surrounding wall of said vessel a cooling space communicating at its upper end with said vapor space, cooling means disposed within said cooling space, and means for optionally establishing communication between said cooling space and said vapor space at the lower portion of the latter.

6. In combination in apparatus of the character described, a vessel for containing a volatile cleaning liquid, said vessel extending above the normal liquid level therein and defining a vapor space above the liquid, said vessel having a top open to the atmosphere for insertion and removal of articles to be cleaned, means for supporting the articles in said space, a partition structure within the vessel and disposed at the side of said vapor space and extending downward into the liquid, said structure defining with the surrounding wall of said vessel a cooling space communicating at its upper end with said vapor space and being adjustable for optionally cutting off and establishing communication between said cooling space and said vapor space at the lower portion of the latter, and cooling means disposed within said cooling space.

7. In combination in apparatus of the character described, a vessel for containing a volatile cleaning liquid, said vessel extending above the normal liquid level therein and defining a vapor space above the liquid, said vessel having a top open to the atmosphere for insertion and removal of articles to be cleaned, means for heating the liquid, means for supporting the articles in said space, a partition disposed at the side of said vapor space in spaced and substantially parallel relation to the surrounding wall of the vessel and defining therewith a cooling space communicating at its upper end with said vapor space, said partition extending downward into the liquid and being provided adjacent its lower end and above the liquid level with a valve controlled opening for controlling communication between said cooling space and said vapor space at the lower portion of the latter, and cooling means disposed within said cooling space and extending downward therein in proximity to said opening.

GEORG WOLFF.